United States Patent
Brand et al.

(10) Patent No.: US 9,613,443 B2
(45) Date of Patent: Apr. 4, 2017

(54) METHOD FOR GENERATING REPRESENTATIONS OF POLYLINES USING PIECEWISE FITTED GEOMETRIC PRIMITIVES

(71) Applicant: Mitsubishi Electric Research Laboratories, Inc., Cambridge, MA (US)

(72) Inventors: Matthew Brand, Newton, MA (US); Tim K. Marks, Newton, MA (US); Rohith MV, Mar Vista, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 84 days.

(21) Appl. No.: 14/270,510

(22) Filed: May 6, 2014

(65) Prior Publication Data

US 2015/0325015 A1 Nov. 12, 2015

(51) Int. Cl.
*G06T 11/20* (2006.01)
*G09B 29/00* (2006.01)

(52) U.S. Cl.
CPC ............ *G06T 11/20* (2013.01); *G06T 11/203* (2013.01); *G09B 29/007* (2013.01)

(58) Field of Classification Search
None
See application file for complete search history.

(56) References Cited

U.S. PATENT DOCUMENTS

| | | | |
|---|---|---|---|
| 6,812,925 B1 | 11/2004 | Krishnan et al. | |
| 7,181,059 B2* | 2/2007 | Duvdevani | G06K 9/00973 348/125 |
| 7,859,536 B2* | 12/2010 | Poppen | G06T 9/20 340/995.1 |
| 2008/0170074 A1* | 7/2008 | Beier | G01C 21/32 345/442 |
| 2010/0272346 A1* | 10/2010 | Chang | G01B 11/24 382/141 |
| 2011/0087715 A1* | 4/2011 | Martens | G01C 21/32 708/200 |

* cited by examiner

*Primary Examiner* — Xiao Wu
*Assistant Examiner* — Steven Elbinger
(74) *Attorney, Agent, or Firm* — Gene Vinokur; James McAleenan; Hironori Tsukamoto (57) ABSTRACT

A method for generating a representation of a polyline formed by a sequence of points determines an overcomplete set of geometric primitives that redundantly fit overlapping sections of the polyline. The overcomplete fitting is performed such that the set includes one or more types of geometric primitives, each fitted to a section of the polyline formed by a subset of the sequence of points. The method determines a local cost of each geometric primitive based on a combination of a fitting error and an encoding cost of the geometric primitive, and determines a join cost of each successive pair of adjacent primitives. Next, the method determines a combination of the geometric primitives forming a connected path along a length of the polyline such that a sum of the local costs of the geometric primitives and the join costs of adjacent primitives in the combination is optimized.

19 Claims, 7 Drawing Sheets

METHOD FOR GENERATING REPRESENTATIONS OF POLYLINES USING PIECEWISE FITTED GEOMETRIC PRIMITIVES

FIELD OF THE INVENTION

The invention relates generally to graphical information systems (GIS), and more particularly to generating a representation of polylines in GIS systems.

BACKGROUND OF THE INVENTION

Two-dimensional curves are the predominant data type in graphical information systems (GIS). Examples include roads, shorelines, and administrative boundaries. Typically these curves are stored as polylines. A polyline is a sequence of point coordinates that are connected by straight line segments. Storing GIS data as polylines is advantageous for various data manipulation and visualization techniques, such as zooming a map on a GPS device, but is inefficient in memory utilization.

It is not unusual for the points in a polyline to oversample the curve, meaning that the polyline uses more points than necessary to represent the curve. Oversampling is inefficient in terms of both memory usage and time required for processing and displaying the polyline. In addition, sampled data points typically include random error or noise, which can dominate the data values in the low-order bits.

Various conventional approaches describe methods for representing polyline data more efficiently. For example, methods described in U.S. Pat. No. 6,812,925 and U.S. Pat. No. 7,859,536 represent polylines with other simpler polylines. The method described in U.S. publication 2011/0087715 simplifies the polyline by representing a subset of points using a circular arc. However, those methods still can be suboptimal.

SUMMARY OF THE INVENTION

Various embodiments of the invention are based on recognition that representing geometric, features with a polyline can be suboptimal. Specifically, the polylines representing geometric features can be more accurately compressed using piecewise fits of geometric primitives forming those features. For example, many of the curves in graphical information systems (GIS) represent man-made features such as roads. By design, roads have segments that are straight (zero curvature), circular arcs (constant curvature), and clothoid (constant rate of curvature change). Additionally, these segments can have smoothed versions of constant-elevation paths through the topography. This suggests that contour data can be more accurately compressed using piecewise fits of those geometric primitives.

Usually, the specific combination of the geometric primitives forming the curves in the GIS represented by a polyline is unknown. However, some embodiments of the invention determine a specific combination using global optimization techniques. In addition, the optimization techniques of some embodiments consider a cost of accuracy of the representation and a cost of encoding of each geometric primitive. Thus, the combination of the geometric primitives representing the polyline is optimized for both accuracy of representation and rate of compression.

Accordingly, one embodiment discloses a method for generating a representation of a polyline formed by a sequence of points. The method includes determining an overcomplete set of geometric primitives that redundantly fit overlapping sections of the polyline, such that the set includes one or more types of geometric primitives, and each geometric primitive, is fitted to a section of the polyline formed by a subset of the sequence of points; determining a local cost of each geometric primitive based on a combination of a fitting error between the geometric primitive and the section of the polyline and an encoding cost of the geometric primitive; determining join costs of pairs of adjacent geometric primitives based on a geometric quality of a join between a pair of adjacent geometric, primitives and an encoding cost of a location of the join; and determining a combination of the geometric primitives forming a connected path along a length of the polyline such that a sum of the local costs of the geometric primitives and the join costs of the pairs of adjacent geometric primitives in the combination is optimized, wherein steps of the method are performed by a processor.

Another embodiment discloses a system for generating a representation of a polyline formed by a sequence of points, including a processor for determining an overcomplete set of geometric primitives that redundantly fit overlapping sections of the polyline; determining a local cost of each geometric primitive based on a combination of a fitting error between a geometric primitive and a section of the polyline and an encoding cost of the geometric primitive; determining a join cost of each successive pair of adjacent geometric primitives; and determining a combination of the geometric primitives forming a connected path along a length of the polyline such that a sum of the local costs and join costs of the geometric primitives in the combination is reduced.

DETAILED DESCRIPTION OF THE PREFERRED EMBODIMENT

Two-dimensional (2D) curves are the predominant data type in graphical information systems (GIS). Examples include roads and political, natural, and administrative boundaries. Typically these curves are stored as polylines, which are sequences of point coordinates that are connected by straight line segments. For example, in maps stored in and used by portable navigation units, such as automobile GPS units, roads and other map features are typically represented as polylines or polygons.

Notably, a polygon is polyline that starts and ends at the same point. Because polygons can be seen as a special case of polylines, this disclosure only discusses polylines, and it is be understood that the methods discussed for polylines can also be applied to polygons.

Storing GIS data as polylines is inefficient. It is not unusual for the points to oversample the curve, and for the low-order bits of each ordinate to be dominated by noise. Some embodiments of the invention are based on a realization that the 2D curves of the GIS can be more efficiently represented with a combination of geometric primitives.

Many of the curves in a GIS represent man-made features such as roads. By design, roads have segments that are straight (zero curvature), circular arcs (constant curvature), and clothoid (constant rate of curvature change), as well as segments that are smoothed versions of constant-elevation paths through the natural topography. This suggests that contour data can be accurately compressed and denoised using piece wise fits of those primitives.

Figure 1:
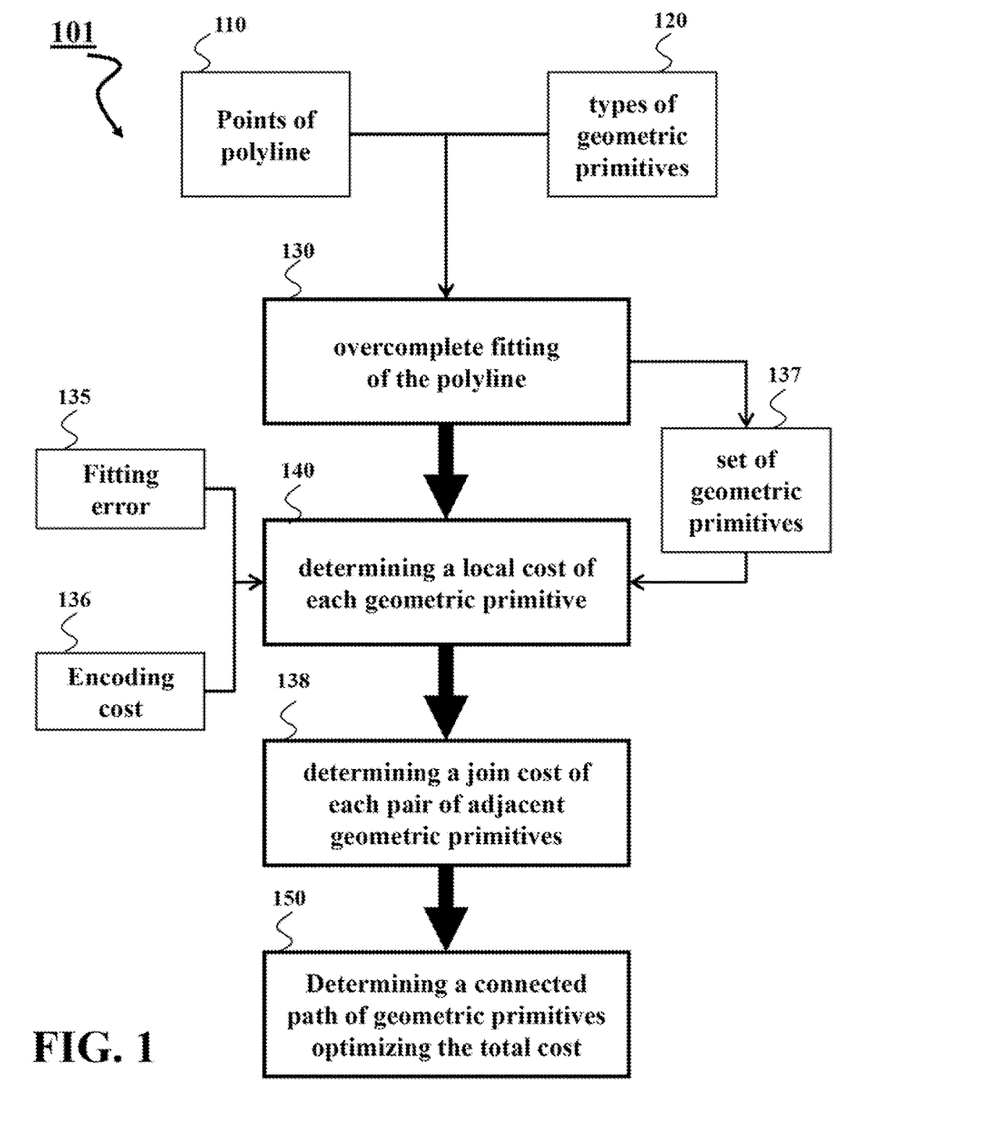
FIG. 1 is a block diagram of a method for generating a representation of a polyline formed by a sequence of points according to some embodiments of the invention.

FIG. 1 shows a method for generating a representation of a polyline formed by a sequence of points according to some embodiments of the invention. The method can be implemented using a processor 101, which can be a part of a standalone data compressing system, and/or a part of the GIS or GPS units.

The method determines 130 an overcomplete set of geometric primitives 137 that redundantly fit overlapping sections of the polyline, such that the set includes one or more types of geometric primitives fitted to sections of the polyline as formed by subsets of the sequence of points. The method determines 140 a local cost of each geometric primitive based on a combination of a fitting error 135 between the geometric primitive and the section of the polyline and an encoding cost 136 of the geometric primitive. The method also determines a join cost 138 between each pair of primitives that could be adjacent in a connected path.

The method determines 150 a combination, of the geometric primitives forming a connected path along a length of the polyline such that a sum of local costs of the geometric primitives in the combination and the join costs of the pairs of adjacent geometric primitives in the combination, i.e., a total cost, is optimized. Usually, the method reduces, e.g., minimizes, the total cost. But other variations of the optimization are possible depending on the formulation of the local cost.

Figure 2A:
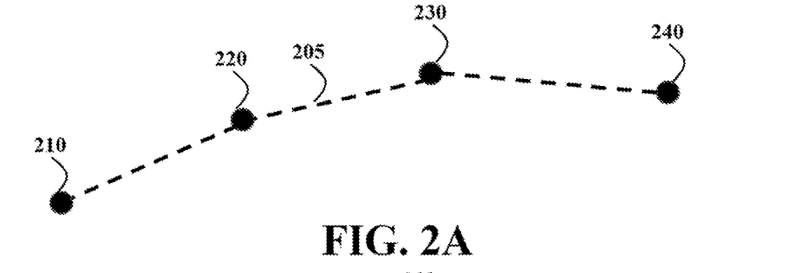
FIGS. 2A, 2B, 2C and 2D are examples of redundant fitting of overlapping sections of the polyline according to some embodiments of the invention.

FIGS. 2A, 2B, 2C and 2D show examples of redundant fitting of overlapping sections of the polyline according to some embodiments of the invention. Specifically, FIG. 2A shows a portion a polyline 205 formed by a set of four ordered points 210, 220, 230 and 240.

Figure 2B:
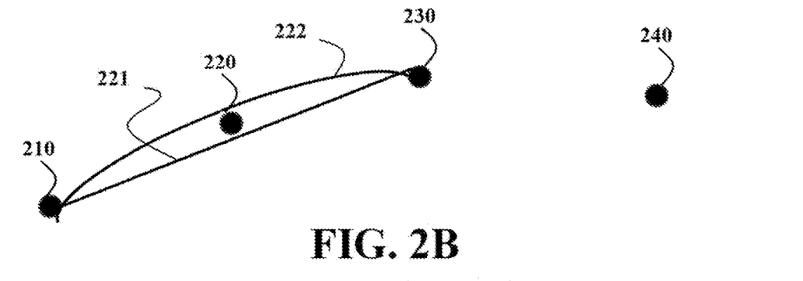

FIG. 2B shows the redundant fitting of a section of the polyline formed by a subset of the sequence of points 210, 220, and 230. Two geometric primitives are fitted to that section, i.e., a line segment 221, and an arc 222. Notably, different embodiments fit different types of the geometric primitives, such that different types of geometric primitives are fitted to the section of the polyline. For example, in one embodiment, the types of geometric primitives include line segments, circular arcs, and clothoids. Other embodiments can use other types of geometric primitives, such as conic sections and splines.

Figure 2C:
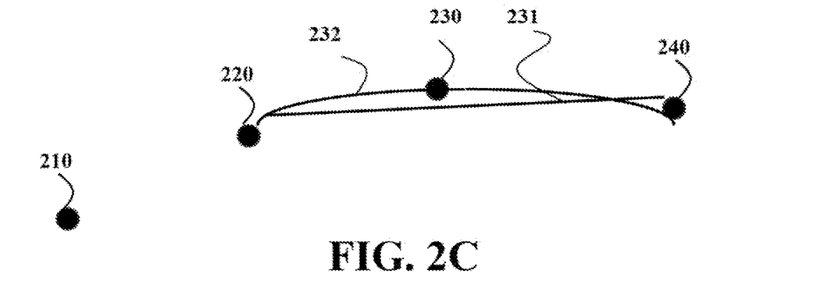
Figure 2D:
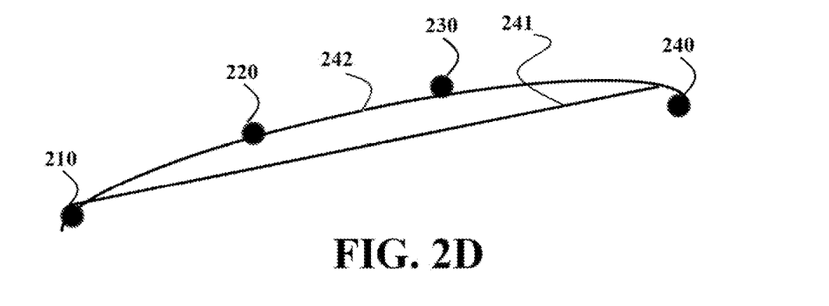

FIG. 2C shows the redundant fitting of a different section of the polyline formed by a subset of consecutive points 220, 230, and 240. Two geometric primitives are fitted into that section, i.e., a straight segment 231, and an arc 232. Similarly, FIG. 2D shows the redundant fitting of a different section of the polyline formed by a subset of consecutive points 210, 220, 230, and 240. Two geometric primitives are fitted into that section, a line segment 241, and an arc 242.

In some embodiments, the geometric primitives do not have endpoints on the polyline. For example, in one embodiment, the set 137 includes at least one geometric primitive that has at least one endpoint not on the polyline. Additionally or alternatively, in another embodiment, at least one endpoint of at least one geometric primitive in the set 137 does not coincide with a point from the sequence of points.

Figure 3:
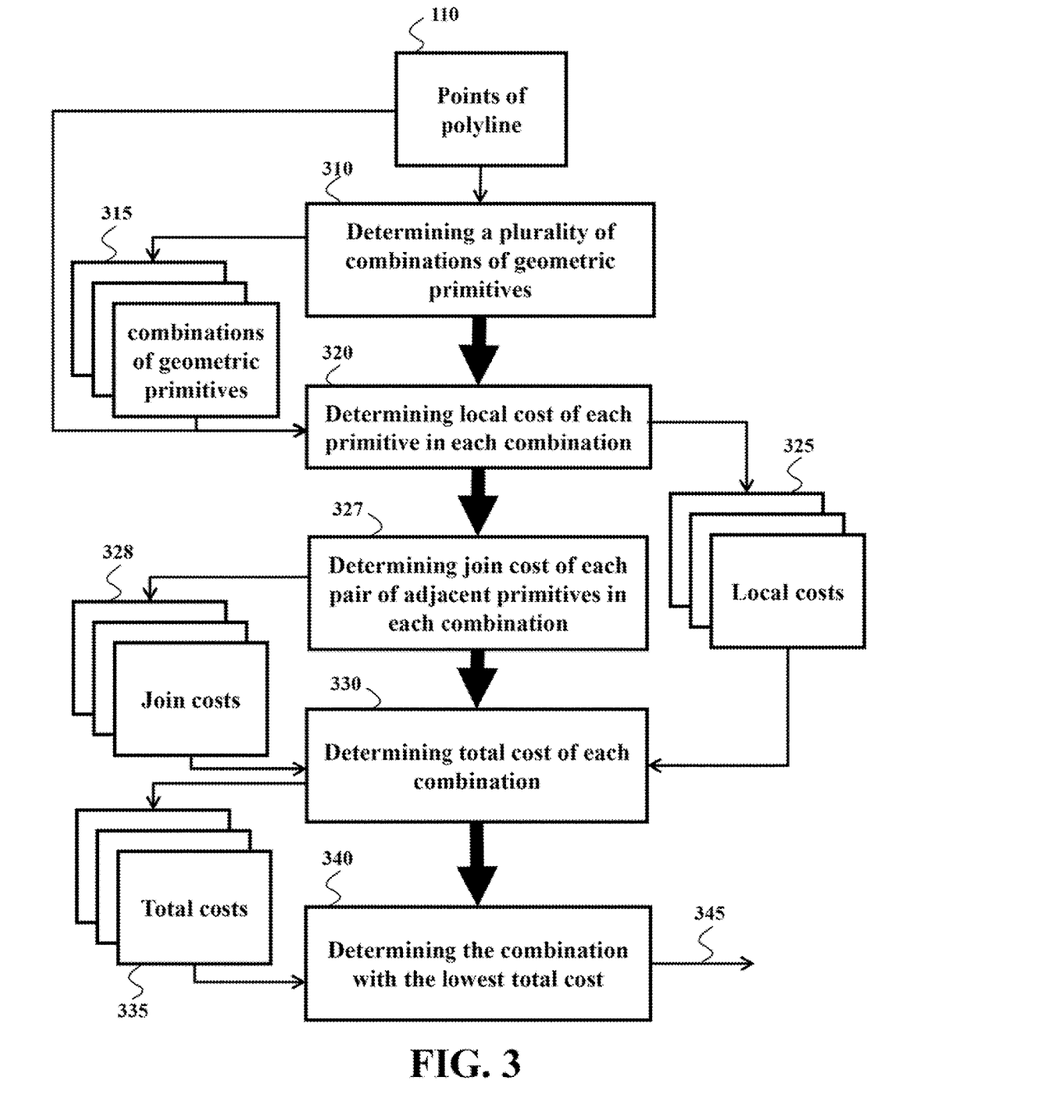
FIG. 3 is a block diagram of an exemplar embodiment for generating a representation of a polyline.

FIG. 3 shows a block diagram of an exemplar embodiment for generating a representation of a polyline. The embodiment determines 310 a plurality of combinations 315 (lithe geometric primitives, in which each combination forms a unique path along the entire length of the polyline. Each path is a connected path, such that each geometric primitive in a combination is fitted to a unique section of the polyline, and the union of those geometric primitives covers the polyline without gaps. In some embodiments, at least some of the combinations of the geometric primitives are refitted to the polyline after optimization.

The embodiment determines 320 the local cost 325 for each geometric primitive in each combination and determines 327 the join cost 328 of each pair of adjacent geometric primitives in each combination. The embodiment sums the local costs and the join costs of the geometric primitives in each combination to determine 330 a total cost 335 of each combination. The embodiment selects 340 the combination 345 of the geometric, primitives with the lowest total cost.

Figure 4:
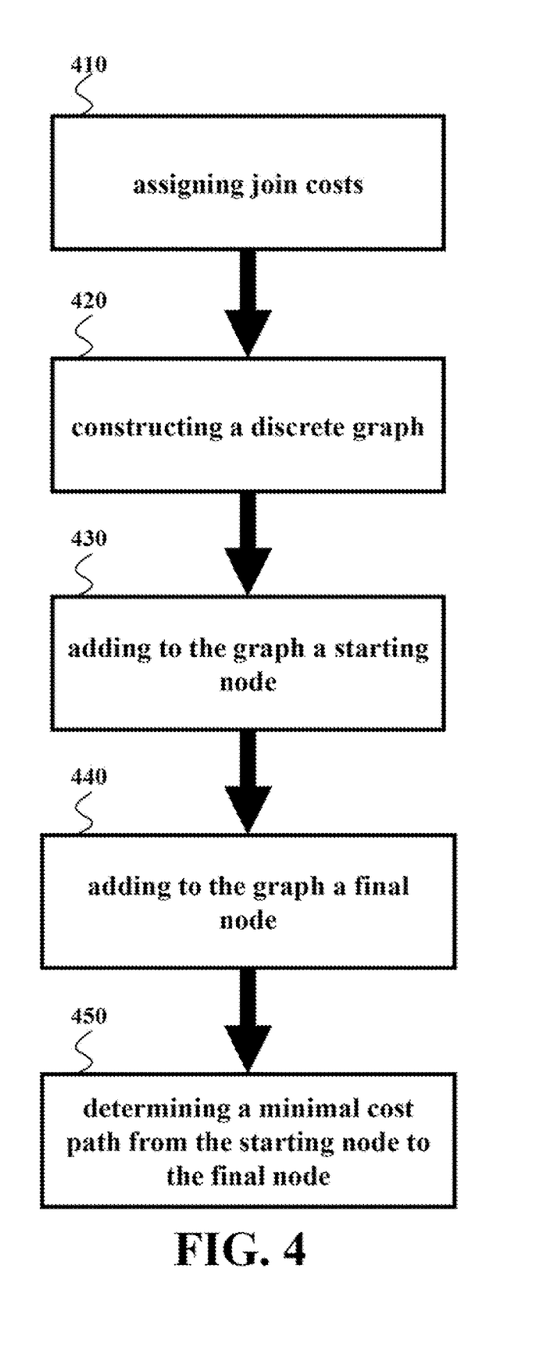
FIG. 4 is a block diagram of an exemplar embodiment for determining the optimal combination of the geometric primitives using dynamic programming (DP) according to some embodiments of the invention.

FIG. 4 shows a block diagram of an exemplar embodiment for determining the optimal combination of the geometric primitives and/or a sum of the local costs and join costs for each combination using dynamic programming (DP).

Figure 5:
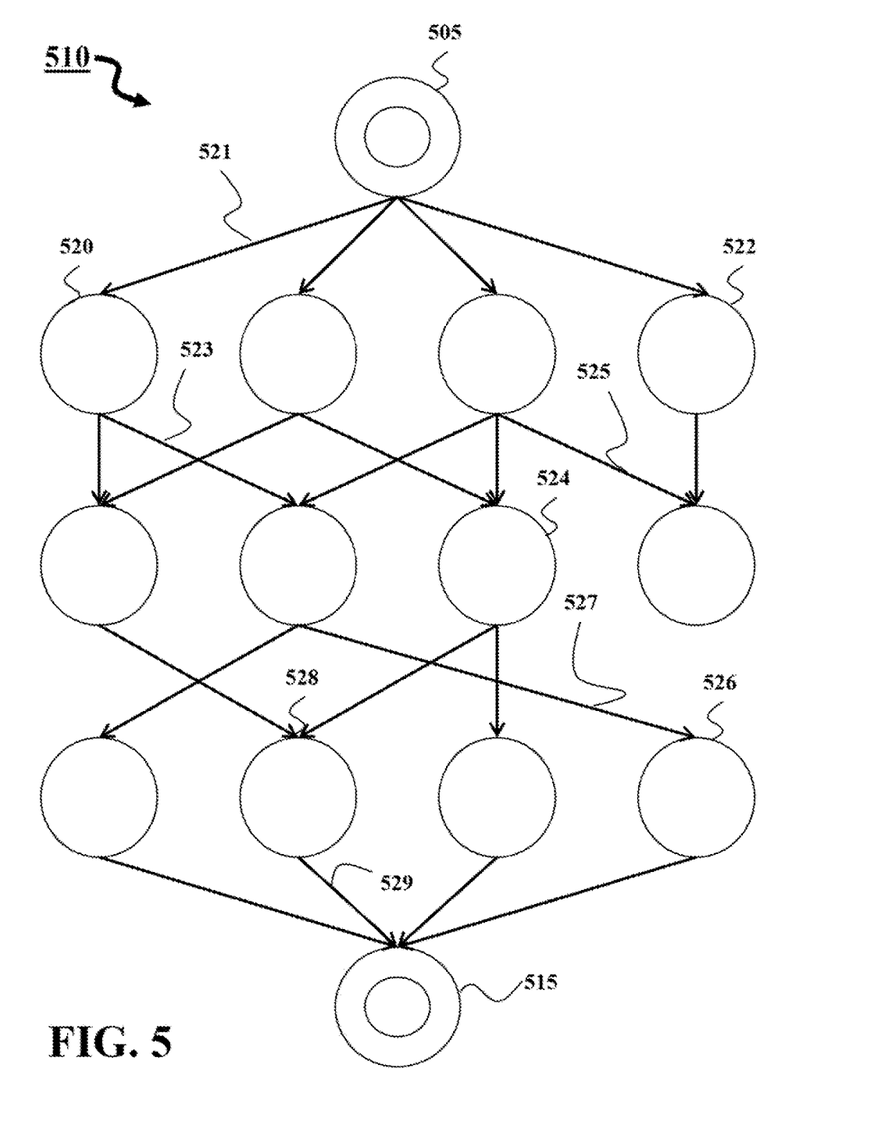
FIG. 5 is an example of a discrete graph constructed using the principles of the DP.

FIG. 5 shows an example of the optimization trellis, which is a discrete graph 501 used by DP to determine the optimal combination. Notably, the DP approach can be used by other embodiments of the invention.

The embodiment assigns 410 each pair of geometric primitives having neighboring endpoints a join cost reflecting a geometric quality (e.g., penalizing lack of smoothness) of the join between the pair of geometric primitives and the encoding cost of a location of the join, and constructs 420 a discrete graph 501 where each join is represented by a weighted edge, e.g., an edge 521, 523, 525, 527, and 529, and each geometric primitive is represented by a weighted node, e.g., a node 520, 522, 524, 526, and 528.

The embodiment adds 430 to the graph a starting node 505 connected to nodes representing geometric primitives that have an endpoint neighboring the beginning of the polyline, and adds 440 to the graph a final node 515 connected to nodes representing geometric primitives that have an endpoint neighboring the ending of the polyline. Next, the embodiment determines 450 a minimal cost path from the starting node to the final node to produce the combination of the geometric primitives using the DP.

The optimization techniques consider the cost of accuracy of representation and the cost of encoding of geometric primitive. In various embodiments, the local cost of each geometric primitive is based on a combination of a fitting error between the geometric primitive and the section of the polyline and an encoding cost of the geometric primitive. Thus, the combination of the geometric primitives representing the polyline is optimized for both accuracy of representation and rate of compression, and optimizes a rate and distortion of the compression.

Figure 6:
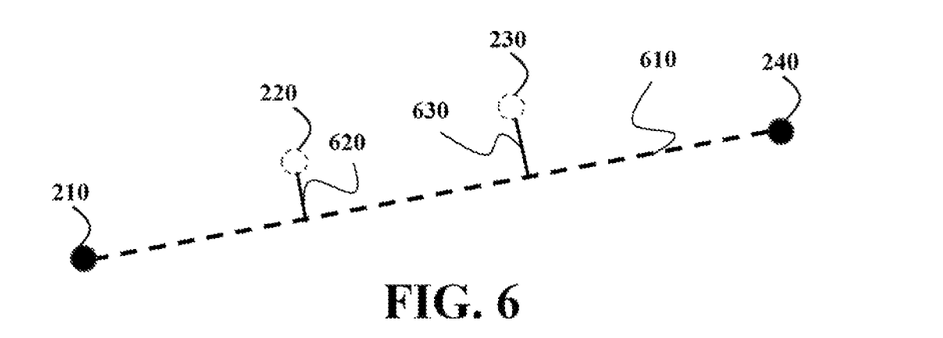
FIG. 6 is a schematic of exemplar embodiment for determining fitting error between the geometric primitive and the section of the polyline.

FIG. 6 shows a schematic of an exemplar embodiment for determining fitting error between the geometric primitive 610 and the section of the polyline 205. In this embodiment, the fitting error is determined as a sum of distances between the points of the polyline and the geometric primitive, e.g., the distances 620 and 630 between points 220 and 230 and the line segment 610. Alternative, embodiments can use different criteria for determining the fitting error, e.g., differences in areas occupied by the section of the polyline and by the fitted geometric primitive.

In addition to the fitting error component of the cost of fitting, the optimization includes encoding cost of the geometric primitive to optimize a compressed representation of the polyline. For example, each fitted geometric primitive can be represented with a certain number of parameters. For example, a line segment can be represented with two parameters (dx, dy), a circular arc can be represented with three parameters (dx, dy, radius), and a clothoid can be represented with four parameters (dx, dy, scale, start).

Also, each kind of parameter has a distribution, which can be approximated from example data using a parameterized distribution function, e.g., uniform distribution for position, beta or Laplacian distribution for curvature, or can be stored non-parametrically, e.g., as a histogram of the data. Based on this distribution, an entropy-constrained quantization scheme can be selected, and some embodiments generate the combination of the geometric primitives with respect to the quantization schemes.

In some embodiments, the rate can be explicitly expressed as a number of bits. As an example, consider circular arcs. Let the distortion error be a squared distance of each fit point to the arc, which is summed over the sample points or integrated over the polyline. Let the quantized representation for (dx, dy) be fixed-point numbers, each represented using k bits (k might be determined by the precision of the display device). Let the quantized representation for the curvature, parameter be symbols from an optimal quantization of a zero-mean Laplacian distribution over scale s, where s might be previously estimated from data. The fit cost is then $$\sum_i \lambda \underbrace{(\|x_i - c\|_2 - r)^2}_{\text{distortion}} + (1 - \lambda)\underbrace{(2k + L_s(r))}_{\text{rate}} + j,$$

where $1 > \lambda > 0$ is a parameter controlling the rate/distortion trade-off; $x_i$ is the ith polyline point fitted by the arc; c is the center and r is the radius of the circle containing the arc; $L_s(r)$ is the number of bits in the codeword whose quantization bin includes r; and j is a join cost reflecting the geometric quality of the join (e.g., penalizes joins that are not smooth) to the next geometric primitive in a path. Note that the join cost j for a geometric primitive depends upon the next primitive in the path; dynamic programming considers all possible combinations.

In some embodiments, the rate, i.e., the coding cost, is incorporated implicitly rather than explicitly into the optimization. For example, if the geometric primitives overcompletely fitted to the polyline $\{x_i\}$ are line segments and circular arcs, then for a given path, the total fit cost can be written as $$\lambda_{err} \underbrace{\sum_i [d(x_i)]^2}_{\text{distortion}} + \lambda_{line} n_{lines} + \lambda_{arc} n_{arcs} + \sum_k j_k,$$

where $x_i$ is the ith point on the polyline fitted by the path, $d(x_i)$ is the distance between $x_i$ and the point on the path that is closest to $x_i$, $n_{lines}$ is the number of line segments in the path, $n_{arcs}$ is the number of circular arcs in the path, and $j_k$ is a join cost reflecting the geometric quality of the join (e.g., penalizes joins that are not smooth) between the kth pair of adjacent geometric primitives in the path. The relative values of the parameters $\lambda_{arc} > 0$ and $\lambda_{line} > 0$ express the relative cost of encoding a line segment versus the cost of encoding a circular arc, and their values relative to $\lambda_{err} > 0$ implicitly determine the rate/distortion trade-off.

The values of the parameters $\lambda_{arc}$, $\lambda_{line}$, and $\lambda_{err}$ can be based on example data with selected values that yield a desired compression rate, a desired distortion level, or a desired rate-distortion trade-off when applied to the sample data.

Furthermore, the encoding cost can be controlled by superimposing a discrete grid on the space and only generating, geometric primitives that have endpoints or control points on this grid, to limit the number of bits used to encode parameters.

The methods of different embodiments can be extended to polylines in 3D, e.g., by overcomplete fitting of parametric space curves. In GIS systems, the third dimension is elevation. Typically elevation data are sparser and less accurate than positional data, and elevation changes are independent of 2D road shape. So the elevation data can often be encoded separately.

GIS data such as road maps are often stored as a large set of polylines, each representing a portion of a road or feature. In some embodiments of the invention, a combination of geometric primitives is determined for each polyline in a large set of polylines.

In a large set of polylines such as those in GIS data, typically many of the polylines are connected, e.g., polylines representing multiple segments of a single road. In such cases, some embodiments include a preprocessing step of chaining together polylines that meet at their endpoints into longer polylines. Each of the resulting polylines is a chain including one or more of the original polylines from the GIS data.

Accordingly, some embodiments determine the polyline 110 by linking multiple polylines of a single geographical feature. For example, two original polylines may be linked when their difference in slopes at their shared endpoint is below a predetermined, threshold.

Once a large set of polylines have been linked into longer chains (each consisting of one or more of the original polylines), the large set of polylines is represented as a smaller set of polylines, each of which is a chain of original polylines. Each polyline in the smaller set is then approximated as a combination of geometric primitives.

In addition, for further compression, some embodiments add as a post-processing step an entropy-based encoding, such as arithmetic encoding, of the set of all of the curve sequences that approximate all of the GIS original polyline data.

Because each chain of initial polylines is not perfectly approximated by the combination of the fitted curves, it is possible that in the compressed version of the GIS data, the fitted curves may intersect in a place where the corresponding original polylines did not, or the fitted curves may fail to intersect where the corresponding original polylines did intersect.

Figure 7A:
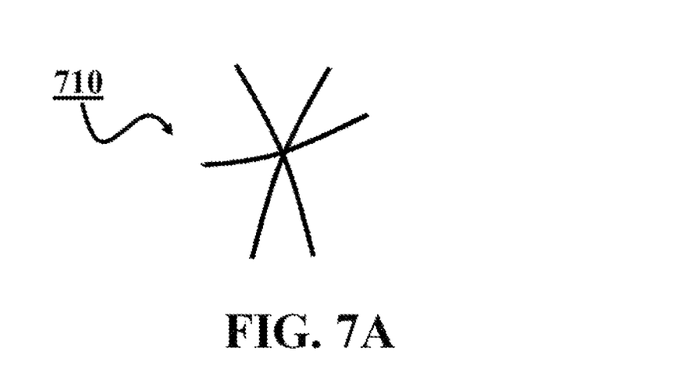
FIGS. 7A, 7B, and 7C are schematics of intersections of three roads before and after compression according to some embodiments of the invention.
Figure 7B:
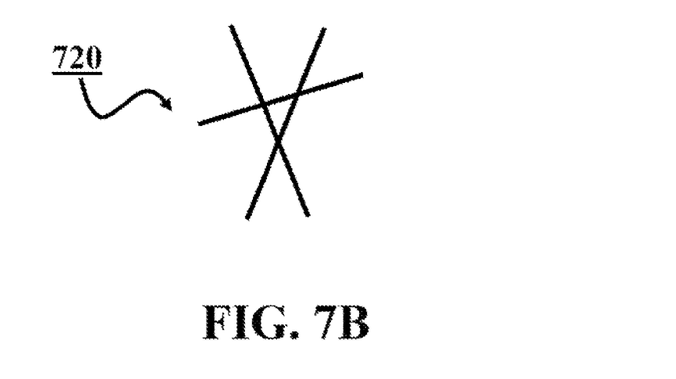
Figure 7C:
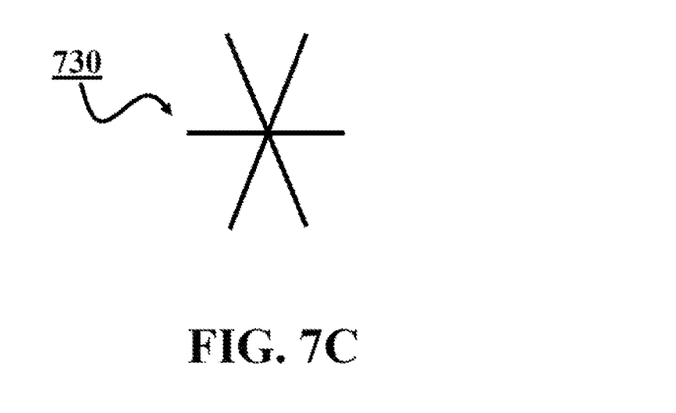

As shown in FIGS. 7A, 7B, and 7C, if three roads 710 intersect at a single point in the original GIS data, after compression the roads 720 may meet at three separate intersection points, e.g., one intersection for each pair of roads. For some GIS data, it may be desired to maintain true intersections or to prevent false intersections in the compressed representation. This can be accomplished, for instance, by detecting false intersections or lost intersections in the compressed data and recompressing the corresponding chains using a larger value of $\lambda_{err}$, or by averaging the three intersection locations to get a single new intersection location and then modifying all three curves to pass through the new intersection location 730.

The compressed data represent the original polylines (or chains of polylines) as combinations of geometric primitives, i.e., chains of curves, that approximate the original polyline data. In some embodiments, the purpose of compression is to reduce the digital storage needed in a device, or to reduce the size of the data for transmission to a device. On a device on which the data are to be displayed, one option for display is to render the curves in the chain directly. On devices that are designed to handle only polyline data, or devices with limited computing power, it may be desired to first sample the curve chain to produce a new polyline that approximates the original polyline.

When it is desired to display the data at different scales (e.g., at a more zoomed-out scale), some embodiments sample the curve chain with a sampling rate depending on the display scale. For example, for display at a more zoomed-out scale, the curve chain can be sampled at a lower rate, yielding a polyline with fewer points. Yet another embodiment compresses the data separately for different scales, for example fitting the original data using a cost function that penalizes fidelity to the original geometry less and penalizes encoding cost relatively more in order to yield a simpler curve chain (with fewer primitives) suitable for display at a more zoomed-out scale.

Various embodiments of the invention can be operated by numerous general purpose or special purpose computing system environments or configurations. Examples of computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, network PCs, mainframe computers, distributed computing environments that include any of the above systems or devices, and the like, i.e., general processors.

For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Although the invention has been described by way of examples of preferred embodiments, it is to be understood that various other adaptations and modifications can be made within the spirit and cope of the invention. Therefore it is the object of the appended claims to cover all such variations and modifications as come, within the true spirit and scope of the invention.

We claim:

1. A method for generating a representation of a polyline formed by a sequence of points, comprising:
    determining, using a processor in communication with a non-volatile computer-readable memory, an overcomplete set of geometric primitives that redundantly fit overlapping sections of the polyline, such that the overcomplete set of geometric primitives includes multiple types of geometric primitives, and geometric primitives of the multiple types are fitted to at least one section of the polyline formed by a subset of the sequence of points;
    determining, using the processor, a local cost of each geometric primitive in the overcomplete set of geometric primitives based on a combination of a fitting error between the geometric primitive and the section of the polyline and an encoding cost of the geometric primitive, wherein the encoding cost of the geometric primitive is a function of a number of bits required to store the geometric primitive in the non-volatile computer-readable memory, wherein at least one geometric primitive has an encoding cost that is different from an encoding cost of another geometric primitive in the overcomplete set of geometric primitives;
    determining, using the processor, join costs of pairs of adjacent geometric primitives in the overcomplete set of geometric primitives based on a geometric quality of a join between a pair of adjacent geometric primitives and an encoding cost of a location of the join;
    determining, using the processor, a combination of the geometric primitives forming a connected path along a length of the polyline such that a sum of the local costs of the geometric primitives and the join costs of the pairs of adjacent geometric primitives in the combination is optimized; and
    storing, using the processor, the optimized combination of the geometric primitives into the non-volatile computer-readable memory, wherein the method results in an efficiency of memory utilization of the non-volatile computer-readable memory.

2. The method of claim 1, wherein the points represent geographical coordinates.

3. The method of claim 1, wherein the types of geometric primitives in the overcomplete set of geometric primitives include a line segment, a circular arc, and a clothoid.

4. The method of claim 3, further comprising:
    determining the local cost of the circular arc of a radius r and a center at a point c according to $$\sum_i \lambda \underbrace{(\|x_i - c\|_2 - r)^2}_{distortion} + \underbrace{(1-\lambda)(2k + L_s(r))}_{rate} + j,$$

where $1 > \lambda > 0$, $x_i$ is an ith polyline point fitted by the circular arc, k is a number of bits required for quantizing a coordinate, $L_s(r)$ is a number of bits required for quantizing the radius, and j is the join cost of the join to a next geometric primitive, wherein a notation $\|x_i - c\|_2$ represents a Euclidean norm of a difference $x_i - c$.

5. The method of claim 3, further comprising:
determining the local cost of a path formed by a combination of line segments and circular arcs according to $$\underbrace{\lambda_{err}\sum_{i}[d(x_i)]^2}_{distortion} + \lambda_{line}n_{lines} + \lambda_{arc}n_{arcs} + \sum_{k}j_k,$$

where $x_i$ is the ith point on the polyline, $d(x_i)$ is a distance between the point $x_i$ and the path, $n_{lines}$ is a number of line segments in the path, $n_{arcs}$ is a number of circular arcs in the path, parameters $\lambda_{arc}>0$ and $\lambda_{line}>0$ represent the relative encoding costs of a circular arc and a line segment, respectively, a parameter $\lambda_{err}>0$ represents a trade-off between the fitting error and the encoding cost, and $j_k$ is a join cost of the join between the kth pair of adjacent geometric primitives in the path.

6. The method of claim 1, further comprising:
determining a sum of the local costs and the join costs for each combination using dynamic programming (DP).

7. The method of claim 6, further comprising:
constructing a discrete graph in which each join is represented by a weighted edge and each geometric primitive is represented by a weighted node;
adding to the graph a starting node connected to nodes that represent geometric primitives that have an endpoint neighboring the beginning of the polyline;
adding to the graph a final node connected to nodes that represent geometric primitives that have an endpoint neighboring the ending of the polyline; and
determining a minimal cost path from the starting node to the final node to produce the optimized combination of the geometric primitives.

8. The method of claim 1, further comprising:
using the optimized combination of the geometric primitives, and
refitting the optimized combination of the geometric primitives to the polyline.

9. The method of claim 8, wherein the refitting provides for one of maintaining true intersections of the polyline, preventing false intersections in the optimized combination of the geometric primitives, or both.

10. The method of claim 1, wherein at least one geometric primitive has at least one endpoint not on the polyline.

11. The method of claim 1, wherein at least one endpoint of at least one geometric primitive does not coincide with the points in the sequence of points.

12. The method of claim 1, further comprising:
generating a representation of a set of polylines, wherein an optimized combination of geometric primitives is determined for each polyline in the set.

13. The method of claim 1, further comprising:
acquiring a set of polylines,
generating a representation of the acquired set of polylines, wherein the generating includes:
preprocessing the acquired set of polylines by chaining together polylines that meet at their endpoints into longer polylines, to obtain a set of polyline chains, each consisting of one or more polylines from the acquired set of polylines, and
generating a representation of each polyline chain in the set of polyline chains using the steps of the method of claim 1.

14. The method of claim 1, further comprising:
acquiring a set of polylines that includes multiple polylines of a single geographical feature,
preprocessing the multiple polylines of the single geographical feature by linking them together into a polyline chain, and
generating a representation of the polyline chain using the steps of the method of claim 1.

15. The method of claim 12, wherein two or more polylines from the set of polylines intersect in an intersection point, wherein an optimized combination of geometric primitives is determined for each polyline, and using the optimized combinations of the geometric primitives, and
modifying at least one of the optimized combinations of geometric primitives, such that the connected paths representing the two or more polylines intersect at a single point.

16. The method of claim 1, further comprising:
using the optimized combination of the geometric primitives, and
sampling the optimized combination of the geometric primitives to produce a new polyline that approximates the polyline.

17. The method of claim 1, further comprising:
superimposing a discrete grid on a space; and
generating only geometric primitives that have endpoints or control points on the discrete grid to limit a number of encoding bits.

18. A system for generating a representation of a polyline formed by a sequence of points, comprising:
a non-volatile computer-readable memory for storing geometric primitives;
a processor, coupled to the non-volatile computer-readable memory, that is configured to:
determine, using the processor, an overcomplete set of geometric primitives that redundantly fit overlapping sections of the polyline, such that the overcomplete set of geometric primitives includes multiple types of geometric primitives, and geometric primitives of the multiple types are fitted to at least one section of the polyline formed by a subset of the sequence of points;
determine, using the processor, a local cost of each geometric primitive based on a combination of a fitting error between a geometric primitive and a section of the polyline and an encoding cost of the geometric primitive, wherein the encoding cost of the geometric primitive is a function of a number of bits required to store the geometric primitive in the non-volatile computer-readable memory, wherein at least one geometric primitive has an encoding cost that is different from an encoding cost of another geometric primitive in the overcomplete set of geometric primitives;
determine, using the processor, a join cost of each successive pair of adjacent geometric primitives;
determine, using the processor, a combination of the geometric primitives forming a connected path along a length of the polyline such that a sum of the local costs and the join costs of the geometric primitives in the combination is optimized; and
store, using the processor, the optimized combination of the geometric primitives into the non-volatile computer-readable memory, wherein the method results in an efficiency of memory utilization of the non-volatile computer-readable memory.

19. A non-transitory computer-readable storage medium embodied thereon a program executable by a processor for performing a method, the method includes generating a representation of a polyline formed by a sequence of points, the method comprising:

determining, using the processor in communication with the non-transitory computer-readable storage medium, an overcomplete set of geometric primitives that redundantly fit overlapping sections of the polyline, such that the overcomplete set of geometric primitives includes multiple types of geometric primitives, and geometric primitives of the multiple types are fitted to at least one section of the polyline formed by a subset of the sequence of points;

determining, using the processor, a local cost of each geometric primitive in the overcomplete set of geometric primitives based on a combination of a fitting error between the geometric primitive and the section of the polyline and an encoding cost of the geometric primitive, wherein the encoding cost of the geometric primitive is a function of a number of bits required to store the geometric primitive in the non-transitory computer-readable storage medium, wherein at least one geometric primitive has an encoding cost that is different from an encoding cost of another geometric primitive in the overcomplete set of geometric primitives, and wherein the fitting error is determined as a sum of squared distances between points of the polyline and the geometric primitive;

determining, using the processor, join costs of pairs of adjacent geometric primitives in the overcomplete set of geometric primitives based on a geometric quality of a join between a pair of adjacent geometric primitives and an encoding cost of a location of the join;

determining, using the processor, a combination of the geometric primitives forming a connected path along a length of the polyline such that a sum of the local costs of the geometric primitives and the join costs of the pairs of adjacent geometric primitives in the combination is optimized;

using the optimized combination of the geometric primitives, and refitting the optimized combination of the geometric primitives to the polyline; and storing, using the processor, the optimized combination of the geometric primitives into the non-transitory computer-readable storage medium, wherein the system results in an efficiency of utilization of the non-transitory computer-readable storage medium.

* * * * *